United States Patent
Sinatov (10) Patent No.: US 11,098,643 B2
(45) Date of Patent: Aug. 24, 2021

(54) METHOD FOR EXHAUST WASTE ENERGY RECOVERY AT THE RECIPROCATING GAS ENGINE-BASED POLYGENERATION PLANT

(71) Applicant: Stanislav Sinatov, Kiryat Ono (IL)

(72) Inventor: Stanislav Sinatov, Kiryat Ono (IL)

( * ) Notice: Subject to any disclaimer, the term of this patent is extended or adjusted under 35 U.S.C. 154(b) by 56 days.

(21) Appl. No.: 16/691,516

(22) Filed: Nov. 21, 2019

(65) Prior Publication Data
US 2020/0165970 A1   May 28, 2020

Related U.S. Application Data

(60) Provisional application No. 62/771,603, filed on Nov. 27, 2018.

(51) Int. Cl.
| | | |
|---|---|---|
| *F02C 3/34* | (2006.01) | |
| *F02C 6/18* | (2006.01) | |
| *F01K 23/10* | (2006.01) | |
| *F01K 23/06* | (2006.01) | |
| *F01K 21/04* | (2006.01) | |
| *F02C 3/28* | (2006.01) | |

(52) U.S. Cl.
CPC ............ *F02C 3/34* (2013.01); *F02C 6/18* (2013.01); *F01K 21/047* (2013.01); *F01K 23/068* (2013.01); *F01K 23/10* (2013.01); *F02C 3/28* (2013.01); *F05D 2260/61* (2013.01); *F05D 2270/08* (2013.01); *F25J 2210/42* (2013.01)

(58) Field of Classification Search
CPC ....... F02C 3/34; F02C 6/18; F02C 3/28; F25J 2210/42; F25J 2210/70; F25J 2240/70; F25J 2270/14; F25J 1/0221; F25J 1/0232; F25J 1/023; F25J 1/0022; F25J 1/004; F25J 1/0012; F25J 1/0251; Y02E 50/10; Y02E 20/14; F05D 2220/62; F05D 2270/08; F05D 2260/61; F01K 23/103; F01K 7/16; F01K 23/065; F01K 23/10; F01K 23/068; F01K 21/047
See application file for complete search history.

(56) References Cited

U.S. PATENT DOCUMENTS

| | | | |
|---|---|---|---|
| 9,618,261 B2 * | 4/2017 | Huntington | ............... F01K 5/02 |
| 10,473,029 B2 * | 11/2019 | Conlon | ................... F25J 1/0228 |
| 10,738,696 B2 * | 8/2020 | Conlon | ..................... F02C 3/22 |
| 2017/0102182 A1 * | 4/2017 | Tremblay | ............... F25J 3/0257 |

* cited by examiner

*Primary Examiner* — Michael C Zarroli (57) ABSTRACT

A method for exhaust waste energy recovery at the reciprocating gas engine-based polygeneration plant which includes supplying this plant with any on-site available methaneous gas, converting from 15 to 30% of supplied gas into electric or mechanical power and producing a liquefied methaneous gas (LMG) co-product from the other 85-70% of supplied gas, and thereby obviates a need for any specialized refrigeration equipment, refrigerants and fuel for LMG co-production at a rate of 0.4-0.6 ton/h for each MW of engine output and makes possible to increase the LMG co-production rate up to 0.9-1.1 t/MWh at the sacrifice of a fuel self-consumption minimized down to 1-2% of the amount of gas intended for liquefaction.

11 Claims, 7 Drawing Sheets

METHOD FOR EXHAUST WASTE ENERGY RECOVERY AT THE RECIPROCATING GAS ENGINE-BASED POLYGENERATION PLANT

CROSS-REFERENCE TO RELATED APPLICATIONS

This application claims the benefits of U.S. Provisional Application No. 62/771,603 filed on Nov. 27, 2018.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF INVENTION

The present invention relates to the field of energy conversion technique, and more specifically to the methods enabling the introduction of a new class of the polygeneration technologies intended, as known, for high-efficient and low carbon emitting simultaneous co-production of power and two or more energy outputs (heat, cold, $CO_2$, etc.) from one energy input (generally fossil or renewable fuel). More particularly, the present invention relates to the methods making possible to profitably combine the operation of the reciprocating gas engine-based power plant with co-production of liquefied methaneous gas (natural gas, biogas, landfill gas, coalbed methane, renewable gas) at a sacrifice of better recovery of exhaust waste energy of such plant.

BACKGROUND OF THE INVENTION

Recovering the exhaust waste energy of the power plants based on the turbocharged reciprocating gas engine prime movers is well known and much used method for increase in total fuel-to-useful energy conversion efficiency through co-production of an additional power in so-called bottoming cycles and/or through harnessing this waste energy for heating, cooling and other purposes. At the same time, it should be stressed that an exhaust waste energy potential of turbocharged reciprocating gas engine, as a more efficient heat engine, is markedly lower in comparison with gas turbine and any improvements in recovering this potential involve the significant difficulties.

The most widespread method for recovering the waste energy of the exhaust gases escaped the cylinders of turbocharged reciprocating gas engine at the enhanced pressure and temperature comprises the following processes: a) recovering a kinetic and a part of thermal energy of exhaust gases in the gas turbine of turbocharger for driving the compressor of this turbocharger; b) use of this compressor for supplying the gas engine with pressurized combustion air; c) further recovering the most of thermal energy of the exhaust gases at atmospheric pressure in waste heat recovery boiler installed downstream of the gas turbine of turbocharger for producing the steam; d) using the steam by the steam turbine of bottoming cycle for producing an additional power or by the industrial customer for process purposes; and e) removing the exhaust gases from the outlet of waste heat recovery boiler into atmosphere at a temperature exceeding a temperature of surroundings by at least 70-90° C.

The main difficulties in using this method are the low capacity and not sufficiently high pressure and temperature of steam produced by the waste heat recovery boiler. Eventually this leads to a small power output of the steam bottoming cycle and its high specific installed costs or to impossibility for using the steam with low parameters in many industrial processes. In addition, a waste heat recovery boiler is characterized by the large specific values (m^2/kWth) of its heat-exchange surfaces, due to the relatively low speeds of exhaust gases and a moderate difference in exhaust gases temperature and water in this boiler. All mentioned problems in recovering the exhaust gas energy are resulting from the advantages of reciprocating engine, as the most efficient heat engine, namely a moderate combustion specific air flow-rate (kg/kWh) and a relatively low temperature of exhaust gases at the inlet of said waste heat recovery boiler.

All technical solutions proposed to improve the described method for recovering the waste energy of the engine exhaust gases may be divided into two groups. The solutions of the first group are described in the published patents and patent applications EP0715058, EP1674681, WO2008/135059, et al. General idea combining all technical solutions of the first group consists in an increase in exhaust gas temperature at the inlet of waste heat recovery boiler through combusting an additional fuel in the duct burner installed directly upstream of the boiler or in the stream of hot pressurized exhaust gases escaped the engine cylinders upstream of the turbocharger's turbine. The latter approach is more thermodynamically efficient, since it makes possible to increase not only a power of the steam bottoming cycle, but a power of turbocharger's turbine as well. However, the economically justified applications of supplementary firing upstream of turbocharger's turbine are limited by a maximum admissible temperature of 650-700° C. at the turbine inlet, otherwise a specially designed and much more expensive gas turbine with cooled blades should be used. In addition, in both mentioned cases the reduction in specific values of boiler heat-exchange surfaces is relatively small, since such boiler is as before operated at the exhaust gases pressure close to atmospheric level.

The solutions of the second group are described in the published patent applications GB1539166, WO 9428298, WO2007/115579, et al. General idea combining all technical solutions of the second group consists in the arrangement of waste heat recovery boiler at the outlet of the engine cylinders in the area of a high temperature and an enhanced pressure of exhaust gases escaped the said cylinders. In this case the turbocharger's turbine is placed downstream of the boiler in the area of the significantly reduced temperature of exhaust gases escaped the said boiler. The described changes in conventional configuration of the exhaust waste energy recovering system make possible to drastically increase the pressure, temperature and flow-rate of steam generated by the waste heat recovery boiler, markedly reduce the specific values of its heat-exchange surfaces and almost double the bottoming cycle power output. However, a temperature of exhaust gases at the inlet of exhaust gas turbine proves to be significantly reduced, resulting in decreasing its power output down to a level insufficient to supply the charging air compressor with a full amount of power required for its driving. In these cases, a part of steam bottoming cycle power output may be used to compensate a deficiency in power for compressor driving. However, in any case the remainder of the increased steam bottoming cycle output provides a significant increase in total plant output and its enhanced efficiency.

As a whole, the technical solutions of both groups can markedly improve the performance of the reciprocating gas engine-based combined cycle or cogeneration plants. However, they are not intended for generation of any new co-product at such plants and do not extend their applicability, which is the main purpose of the invented method. As this co-product, the liquefied methaneous gas (LMG) generated in the small-scale volumes at a sacrifice of exhaust waste energy of reciprocating gas engine-based polygeneration plant was chosen. In so doing, the following considerations have been taken into account: a) a wide spectrum of the methaneous gases (pipeline natural gas, biogas, landfill gas, coal-bed methane and renewable gas) which may be locally available for liquefaction; b) operation of gas engine(s) on the same fuel which is intended to be liquefied at the plant; c) possibility for creation of the on-site LMG storages, providing the supply of the same or co-located peaking power plant with stored fuel during periods of high-demand for power and gas from the networks; d) availability of the promising and rising markets for LMG products; and e) a high profit which may be obtained from a cheap LMG co-production at the gas engine polygeneration plants through recovering their exhaust waste energy. Such LMG co-production could replace a small-scale LMG production at the specialized plants which is characterized by a very high energy intensity and performed with use of the costly refrigeration equipment and refrigerants. It was found that at the reciprocating gas engine-based polygeneration plants the exhaust gases of a prime mover may be converted into an effective refrigerant, whereas a recovery of their cold thermal energy may eliminate or minimize a need for energy in the LMG production.

The use of the power plant exhaust gases for co-producing the liquefied natural gas (LNG) is described in the U.S. Pat. No. 9,618,261, as applied to the gas turbine-based power plant. However, the used approach cannot be applied to the reciprocating gas engine-based power plant owing to the distinctions between the working principles of gas turbine and gas engine. In addition, according to the proposed technical solution, the gas turbine exhaust gases should contain only nitrogen, carbon dioxide and water vapor. For these purposes, a gas turbine should be converted from operation on an open Brayton cycle into operation on a semi-closed Brayton cycle using exhaust gas recirculation (EGR) at a substantially stoichiometrically balanced conditions. Up to now this is a stubborn technical problem, which is additionally complicated by a need for decarbonization of gas turbine exhaust. By this means for the co-production of LNG at the reciprocating gas engine-based power plants a new method of converting the exhaust gases into an effective refrigerant should be elaborated.

This can be made using the general ideas underlying the technical solutions of both groups described above. However, practical realization of these ideas calls for a new approach and the novel technical solutions. In particular, a placement of exhaust gas turbine downstream of waste heat recovery boiler, as it is proposed in the patent application WO2007/115579, does not provide reduction in temperature of exhaust gases escaped the turbine below −25÷−40° C. At the same time, to use these gases as refrigerant for methaneous gas liquefaction, the turbine outlet temperature should be below at least −90÷−100° C. On the other hand, a possible usage of supplementary firing before the waste heat recovery boiler arranged at the outlet of engine cylinders calls for placement of duct burner in the stream of hot pressurized exhaust gases, contrary to its arrangement in the stream of non-pressurized exhaust gases, proposed in the patent application EP1674681.

As a whole, the method for exhaust waste energy recovery at the reciprocating gas engine-based polygeneration plants is selected as a subject for the improvement in the present invention. Thereby, far more complete harnessing the thermal energy of exhaust gases and an innovative recovering their kinetic energy being used for co-production of power and on-site liquefaction of methaneous gas are found to be the proper ways for achievement of the invention's goals.

SUMMARY OF THE INVENTION

In one or more embodiments, a proposed method for an exhaust waste energy recovery at a reciprocating gas engine-based polygeneration plant may comprise in combination: a) supplying said polygeneration plant with a methaneous gas selected from a group consisting of pipeline natural gas, biogas, landfill gas, coal-bed methane and renewable methane and used as a fuel in said gas engine; b) supplying the gas engine with a charging air pressurized by an air compressor and cooled upstream of the gas engine; c) burning a mixture of the fuel and the charging air in the gas engine with producing a gas engine power output, as a main product of the polygeneration plant, and releasing a pressurized exhaust gas stream comprising a mixture of nitrogen, oxygen, carbon dioxide and water vapor at a high temperature; d) harnessing most of a hot thermal energy of the pressurized exhaust gas for production of a process steam in a waste heat recovery boiler installed at an outlet of the gas engine; e) using the process steam for production of a power output of a steam bottoming cycle; f) expanding the pressurized exhaust gas in a gas turbine installed downstream of said waste heat recovery boiler, resulting in recovering a kinetic energy and a remainder of a thermal energy of the pressurized exhaust gas for production of a power output of said gas turbine; and g) using at least a part of the power output of said gas turbine and said steam bottoming cycle for driving said air compressor.

In so doing, the method may additionally comprise: a) supplying the polygeneration plant with said methaneous gas at a rate exceeding an amount of said fuel used by the gas engine; b) forming a pre-treated methaneous gas stream through drying and purifying a supplied methaneous gas as needed to meet a pre-treatment quality standard set up for the methaneous gas being liquefied; c) compressing the pre-treated methaneous gas up to a high pressure of at least 60 barA by a methaneous gas compressor if necessary, resulting in forming a high-pressure methaneous gas stream; d) pre-cooling said high-pressure methaneous gas so, forming a pre-cooled high-pressure methaneous gas stream; e) reducing in temperature of the pressurized exhaust gas escaped the waste heat recovery boiler to a near ambient value with accompanied drainage of a formed condensate; f) a drying of the pressurized exhaust gas and a following pre-cooling of a dried pressurized exhaust gas to a temperature below 0° C. in a cold regenerator so, forming a dried and pre-cooled pressurized exhaust gas stream upstream of said gas turbine; g) said expanding the dried and pre-cooled pressurized exhaust gas in the gas turbine, resulting in producing the power by said gas turbine and forming a deeply cooled non-pressurized exhaust gas stream escaped the gas turbine; h) recovering a cold thermal energy of said deeply cooled non-pressurized exhaust gas first for a liquefying of the whole of said pre-cooled high-pressure methaneous gas in a gas liquefier and then for said pre-cooling of the dried pressurized exhaust gas in said cold regenerator; i) using a non-pressurized exhaust gas removed from the cold regenerator to an atmosphere for removing a water vapor captured during said drying of the pressurized exhaust gas; j) depressurizing a high-pressure liquefied methaneous gas escaped the said gas liquefier down to a selected low pressure, resulting in forming a low-pressure two-phase liquefied methaneous gas stream; k) separating said low-pressure two-phase liquefied methaneous gas stream, resulting in forming a low-pressure methaneous vapor stream and a low-pressure liquefied methaneous gas stream; l) using said low-pressure methaneous vapor as the fuel for the gas engine; m) using said low-pressure liquefied methaneous gas as a co-product of the polygeneration plant; and n) using a part of the power outputs of the gas turbine and the steam bottoming cycle for driving said methaneous gas compressor.

In one or more embodiments, said depressurizing the high-pressure liquefied methaneous gas may be performed sequentially first in a work-performing liquefied methaneous gas expander so that a medium-pressure liquefied methaneous gas is formed and then in a Joule-Thompson valve.

In one or more embodiments, a cold thermal energy of the low-pressure methaneous vapor may be recovered first for subcooling said medium-pressure liquefied methaneous gas upstream of the Joule-Thompson valve, and then for said pre-cooling of the high-pressure methaneous gas upstream of said gas liquefier.

In one or more embodiments, a pressure of the low-pressure methaneous vapor upstream of the gas engine may be provided at a level exceeding a pressure of the charging air through said selecting of the low pressure of said two-phase liquefied methaneous gas stream or/and compressing the low-pressure methaneous vapor if necessary.

In one or more embodiments, said drying of the pressurized exhaust gas may be performed by a pressure swing adsorber, wherein said non-pressurized exhaust gas outgoing from the cold regenerator is used for purging a regenerated bed of said pressure swing adsorber.

In one or more embodiments, removing the non-pressurized exhaust gas from the pressure swing adsorber to the atmosphere may be performed by an exhaust fan consuming a part of the power outputs of the gas turbine and the steam bottoming cycle.

In one or more embodiments, an enhanced yield of the polygeneration plant co-product may be achieved through an increase in a pressure of the high-pressure methaneous gas at an outlet of the methaneous gas compressor up to a value exceeding 60 barA.

In one or more embodiments, an enhanced yield of the polygeneration plant co-product at a given pressure of the charging air may be achieved through an increase in a pressure of the dried and pre-cooled pressurized exhaust gas at an inlet of the gas turbine, resulting in producing an extra power output by said gas turbine and in additional reducing a temperature of the deeply cooled non-pressurized exhaust gas stream escaped the gas turbine.

In one or more embodiments, said increase in the pressure of the dried and pre-cooled pressurized exhaust gas may be performed with use of an exhaust gas compressor installed upstream of the pressure swing adsorber and equipped with an aftercooler.

In one or more embodiments, an extra power output of the steam bottoming cycle may be provided through supplementary firing an additional fuel in the stream of the pressurized exhaust gas ahead of the waste heat recovery boiler.

In one or more embodiments, said extra power outputs of the steam bottoming cycle and the gas turbine may be consumed for driving said exhaust gas compressor and for serving the needs of the methaneous gas compressor for a higher power input.

BRIEF DESCRIPTION OF THE DRAWINGS

Embodiments will hereinafter be described in detail below with reference to the accompanying drawings, wherein lie reference numerals represent like elements. The accompanying drawings have not necessarily been drawn to scale. Where applicable, some features may not be illustrated to assist in the description of underlying features.

DETAILED DESCRIPTION OF THE INVENTION

The practical realization of the proposed method for exhaust waste energy recovery at the reciprocating gas engine-based polygeneration (GPG) plant may be performed through an innovative use of gas engine exhaust for liquefying most of the methaneous gaseous fuel (pipeline natural gas, biogas, landfill gas, coal-bed methane and renewable methane) delivered into such plant. By this means the GPG plant may be used for co-production of power and liquefied methaneous gas (LMG); in so doing on-site liquefaction of methaneous gas at the GPG plant in the wide range of LMG co-product pressure is distinguished from LMG production at the specialized small-scale plants by much greater simplicity of the proposed process and its much higher efficiency. Taking into account that the energy and pre-treatment costs are particularly high at the small-scale LMG plants and that the invented method may drastically reduce these costs, it may be especially promising for co-production of the LMG at a rate up to 1.10 t/h per each MW of the GPG plant electric output.

Figure 1:
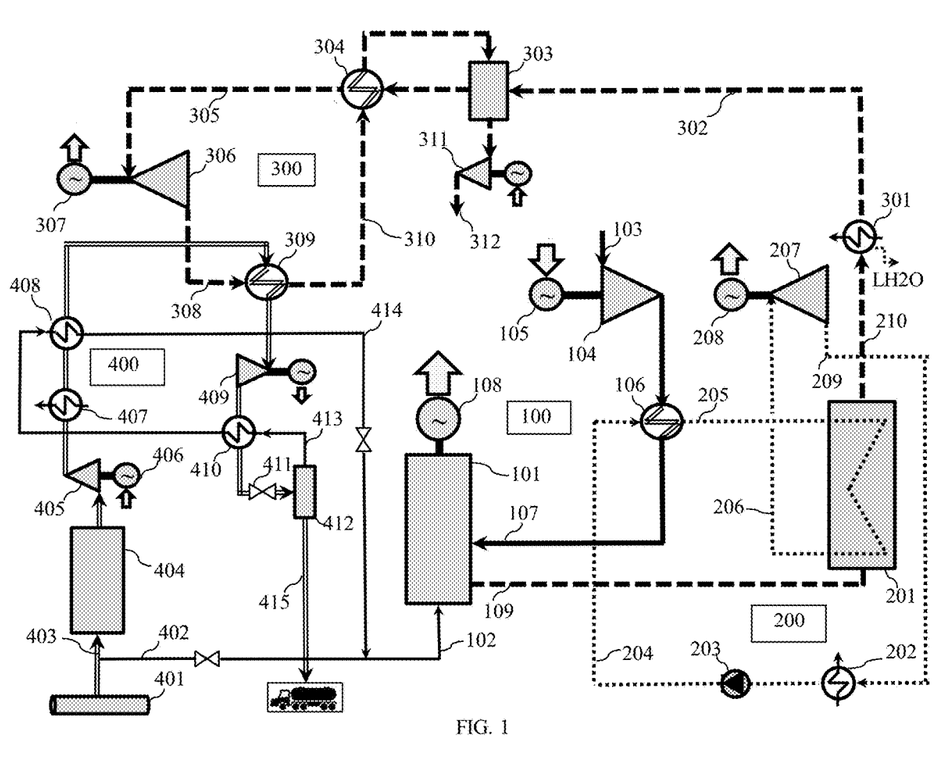
FIG. 1 is a schematic view of the first embodiment of the reciprocating gas engine-based polygeneration (GPG) plant using the invented method of exhaust waste energy recovery for co-production of power and liquefied methaneous gas (LMG).

The FIG. 1 is a schematic view of the first embodiment of GPG plant using the invented method of exhaust waste energy recovery for co-production of power and LMG in the simplest plant configuration without consumption of any additional fuel or power. Here the involved equipment packages are designed as 100—supercharged reciprocating gas engine package in the standard configuration but without turbocharger, 200—steam bottoming cycle package, 300—terminal exhaust energy recovery package, and 400—methaneous gas liquefaction package. The interaction of the equipment in all mentioned packages goes on as follows.

The basic gas engine 101 of package 100 is supplied with charging air via pipe 107. This air is captured from atmosphere via pipe 103, pressurized by air compressor 104 driven by a motor 105 and cooled in in the air cooler 106. The gas engine 101 is also supplied via pipe 102 with methaneous gaseous fuel, which is delivered either from liquefaction package 400 via pipe 415 or directly from the pipeline 401 via pipe 402. The mechanical work done by gas engine 101 is converted into electrical power by generator 108, whereas the pressurized exhaust gases escape the engine cylinders at a high temperature of 500-550° C. via pipe 109.

A high-temperature part of exhaust thermal energy is converted into mechanical power in the steam bottoming cycle package 200. Here a cooling of pressurized exhaust gases is performed in the small-sized one pressure level waste heat recovery boiler 201, resulting in generation of high-pressure superheated steam at the outlet of this boiler. The steam is delivered via pipe 206 into condensing steam turbine 207, wherein steam expansion leads to performing a mechanical work by this turbine coupled with an electric generator 208. The exhaust steam is directed via pipe 209 to the water or air-cooled condenser 202, from where condensate is delivered by high-pressure pump 203 via pipe 204 into cooler 106. Here a compression heat of charging air is used to preheat the circulated water upstream of waste heat recovery boiler 201, where the preheated water is directed via pipe 205.

The terminal exhaust energy recovery package 300 is intended for converting the exhaust gases into an effective refrigerant and for use of this refrigerant in the process of liquefaction of supplied methaneous gas. For these purposes, the exhaust gases escaped the boiler 201 are first directed via pipe 210 to the heat exchanger 301, wherein they are cooled down to a near ambient temperature with accompanied drainage of condensate ($LH_2O$) formed. The extracted heat is dissipated into surroundings or/and used for heating purposes. A recovered heat becomes the third co-product of GPG plant, increasing significantly the plant total fuel efficiency.

In any case the pressurized exhaust gases with water vapor content not exceed 0.5-0.7% (m/m) are directed via pipe 302 to the working chamber of a standard two-chamber pressure swing adcorber (PSA) 303, wherein the gases are cleaned from the water vapor components. The cleaned and pressurized exhaust gases are further subjected to a pre-cooling down to −40÷−50° C. in the cold regenerator 304 and directed via pipe 305 to the gas turbine (work-performing low-pressure expander) 306.

The pressurized, pre-cooled and cleaned exhaust gases are expanded in this gas turbine coupled with generator 307, wherein mechanical work of turbine is converted into electric power. The expansion of exhaust gases is accompanied by their deep cooling significantly below −100° C., at which the formation of solid $CO_2$ (dry ice) in the stream of non-pressurized exhaust gases escaped the turbine 306 is however excluded. At the same time, a cold thermal energy of these non-pressurized gases is large enough to use them as refrigerant for liquefaction of a pressurized methaneous gas in the gas liquefier 309 installed downstream of the turbine 306.

The rest of a cold thermal energy of the non-pressurized exhaust gases escaped the gas liquefier 309 is recovered in the cold regenerator 304, where these gases are directed via pipe 310. Here this cold thermal energy is used for said pre-cooling of the pressurized exhaust gases upstream of the gas turbine 306. The non-pressurized exhaust gases outgoing from the cold regenerator 304 are used for purging the sorbent bed of the second chamber of the PSA unit 303 which is in regeneration operation mode. An electrically-driven exhaust fan 311 is optionally used for removing the non-pressurized exhaust gases from the PSA device 303 into atmosphere via pipe 312.

The GPG plant is supplied with a methaneous gas (MG) from the pipeline 401 with its delivering into gas engine 101 via a pipe 402 during plant start-up and via a pipe 414 during operation of the plant. A pressure of supplied gas in the pipe 402 exceeds usually a pressure of the charging air in the pipe 107 at the gas engine inlet, whereas in the pipe 414 the mentioned fuel pressure is maintained as result of operating the equipment in the package 400. During plant operation all delivered MG is directed via pipe 403 to a pre-treatment unit 404, wherein the MG is subjected to dehydration and cleaning from $CO_2$, aromatic and paraffin hydrocarbons. If a pressure of supplied MG is below 60 barA, a cleaned gas is further compressed up to 60-80 barA in the MG compressor 405 driven by a motor 406. A temperature of this cleaned and high-pressure (HP) MG is further reduced in the conventional gas cooler 407 down to a value close to a temperature of atmospheric air. Following pre-cooling the HP cleaned MG prior to the gas liquefier 309 is performed in the cold vapor recuperator 408, resulting in reducing a gas temperature below 0° C. At this temperature the cleaned and pre-cooled HP MG is directed to the gas liquefier 309, wherein full gas liquefaction is performed through recovering a cold thermal energy of the deeply cooled non-pressurized exhaust gas. The HP liquefied methaneous gas (HP-LMG) outgoing from liquefier 309 is further reduced in pressure first in the work-performing liquefied gas expander 409, then subcooled in the heat exchanger 410 and finally depressurized down to a selected low pressure (LP) in the Joule-Thompson valve 411. A liquefied two-phase LP stream outgoing from the JTV device is separated in the gas separator 412 into a gas vapor stream 413 used as fuel for the gas engine 101 and a stream 415 recovered as LP-LMG co-product of the GPG plant. A cold thermal energy of the gas vapor stream 413 is recovered first in the heat exchanger 410 for said subcooling purposes and then in the cold vapor recuperator 408 for said pre-cooling purposes. If the selected low pressure of the LP-LMG co-product is below a pressure of the charging air in the pipe 107 at the gas engine inlet, a fuel compressor installed in the pipe 414 (not shown) is used to provide a required fuel pressure at the engine inlet.

A total power output of the steam turbine 207, gas turbine 306 and liquefied gas expander 409 is sufficient to meet the plant power demands for driving the air compressor 104, water pump 203, exhaust fan 311 and gas compressor 405. This makes possible to supply a grid with a power output of the gas engine 101 designed by a manufacturer for its operation in the simple cycle operation mode and simultaneously to co-produce 0.4-0.6 t/h of the LP-LMG per each MW of the engine power output. In so doing, any consumption of an additional fuel for the mentioned purposes is obviated.

Figure 2:
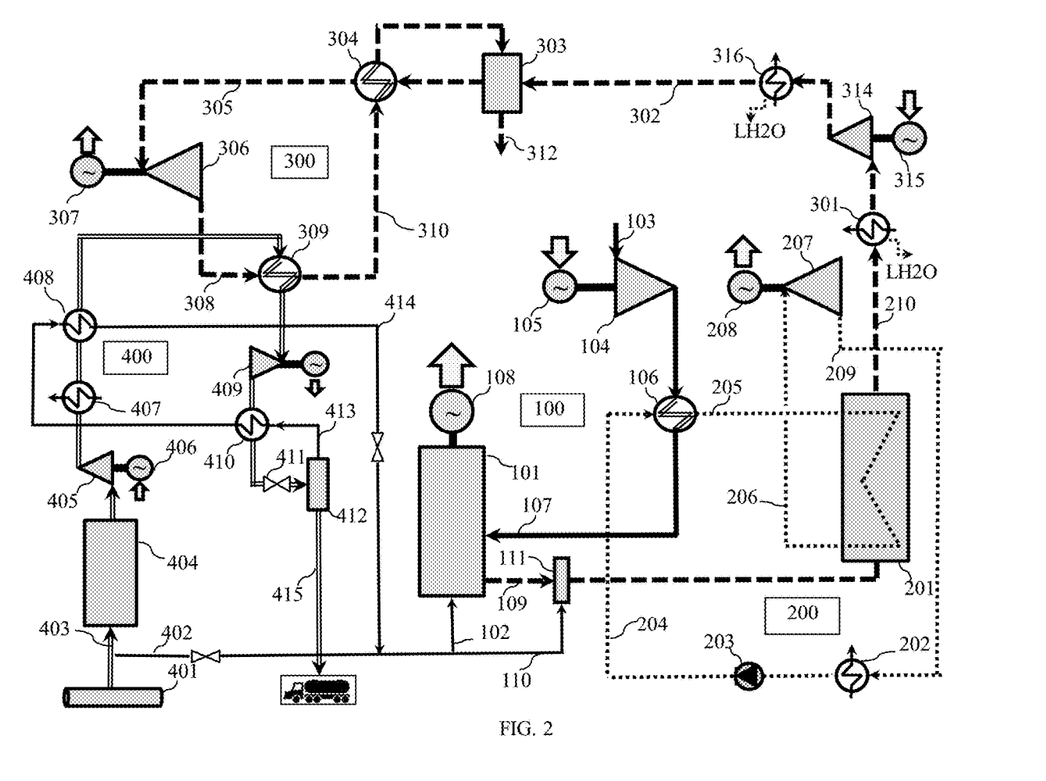
FIG. 2 is a schematic view of the second embodiment of the GPG plant using the invented method of exhaust waste energy recovery for co-production of LMG.

FIG. 2 is a schematic view of the second embodiment of the GPG plant using the invented method of exhaust waste energy recovery for co-production of LMG. It makes possible to increase a LP-LMG co-production capacity by a factor of 2-2.5 without changes in design and parameters of the gas engine selected for installation in the first embodiment of the GPG plant. In so doing, an enhancement in LP-LMG co-production rate may be achieved through using any one or combination of two following methods: a) a further increase in pressure of the HP pre-cooled MG at the inlet of gas liquefier 309, resulting from a corresponding enhancement in gas pressure at the outlet of MG compressor 405; and b) a further reduction in temperature of the deeply cooled non-pressurized exhaust gas at the inlet of said gas liquefier 309, resulting from a higher pressure drop in the gas turbine 306 and calling for a correspondingly higher pressure of the pre-cooled pressurized exhaust gas at the inlet of said gas turbine. The latter approach may be realized through an additional compression of the pressurized exhaust gas escaped the waste heat recovery boiler 201 by an exhaust gas compressor 314 driven by a motor 315 and equipped with an aftercooler 316 and a condensate drainage device. In so doing, an enhancement in power output of the gas turbine 306 may be used to partially compensate for a power required for driving the exhaust gas compressor 314, whereas removing the non-pressurized exhaust gas from the PSA device 303 into atmosphere may be performed without use of the exhaust fan 311 (see FIG. 1).

However, as a whole the use of the described methods for enhancement in LMG co-production calls for an enhanced self-consumption of a power for driving the up-graded MG compressor 405 or/and the additionally installed exhaust gas compressor 314. A required amount of power may be extracted from the electric output 108 of the gas engine 101, resulting in a drastic increase in LP-LMG co-production rate at the sacrifice of a moderate and acceptable decrease in the GPG electric output. Another way consists in production of a required additional power by the steam turbine 207 through an increase in pressure, temperature and flow-rate of a steam generated in the bottoming cycle. For this purpose, a small amount of an additional fuel is delivered via a pipe 110 into a duct burner 111 installed upstream of the waste heat recovery boiler 201. Production of an additional power in the steam bottoming cycle, resulting from supplementary firing of this fuel in the stream 109 of the hot and pressurized exhaust gas escaped the gas engine 101, is characterized by a very high fuel-to-power conversion efficiency exceeding an efficiency of the gas engine and makes possible to enhance a LP-LMG co-production rate without decrease in the GPG plant electric output.

INDUSTRIAL APPLICABILITY

The performances of the reciprocating gas engine-based polygeneration (GPG) plant using the proposed method for exhaust waste energy recovery are presented below in the tabulated and graphic forms. In the basic configuration the designed GPG plant is, for example, equipped with one supercharged reciprocating gas engine and supplied with natural gas (NG) from the main pipeline. The most of delivered fuel is destined for on-site liquefaction, whereas the remainder is used as fuel for the said engine. The engine is supplied with 15.1 kg/s of a charging air pressurized up to about 3.9 barA by the air compressor which consumes about 2.6 MWe of electrical power. The engine produces about 9.7 MWe of electric power with fuel-to-power conversion efficiency of 46.3%. The pressurized exhaust gases escape the engine cylinders at a pressure of about 3.6 barA and temperature of approximately $T_{EXH-OUT}$=535° C. A high temperature part of waste thermal energy is used in the simplest one pressure level steam bottoming cycle with the a small-sized pressurized waste heat recovery boiler and steam turbine producing about 2.1 MWe of electrical output without supplementary firing of an additional fuel.

In the basic GPG plant configuration the exhaust gas compressor is not used. Therefore, these gases are further cleaned, pre-cooled and used for an additional generation of about 0.8 MWe by the gas turbine with following their converting into an effective refrigerant applied to liquefaction of the entire NG stream delivered into the GPG plant. This NG is delivered at a selected pressure of 60 barA and dehydrated in the pre-treatment package, wherein a $CO_2$ content in natural gas is usually also reduced. However, taking into account a drastic increase in $CO_2$ solubility in the pressurized LNG, a permissible $CO_2$ content in the natural gas at the outlet of pre-treatment unit may be increased up to 0.5-1.0% (v/v). Consequently, the $CO_2$ removal part of pre-treatment unit may be minimized or even obviated. Therefore, in the basic GPG plant configuration the features required of a design of the NG pre-treatment unit should correspond to a pressure of the co-produced LNG selected at the level of 5.1 barA. The cleaned NG is further moderately pressurized up to 80 barA by the NG compressor consuming only 0.08 MWe, then the NG is pre-cooled and fully liquefied in the gas liquefier. After two-stage depressurization of the full liquefied natural gas stream and separation of the formed two-phase stream, the LP-LNG co-product at a rate of $G_{LNG}$=~4.2 ton/h is delivered to the customers at the rated pressure of 5.1 barA, whereas the gas vapor produced at a rate of ~1.55 ton/h is used as gaseous fuel for the gas engine, providing ~21 MWth of heat input in the GPG plant. By this means 27% of all NG delivered into the GPG plant is converted into plant power output of $W_{GPG}$=9.9 MWe, whereas 73% of NG delivered is converted into LP-LNG co-product. A power equivalent of this LNG co-produced may be estimated using equation proposed in the Tractebel 2015 report for WBG and resulting in $W_{LNG}$=(998.4−39.5× $G_{LNG}$)×($G_{LNG}$/1000)=3.5 MWe. With regard to the estimated $W_{LNG}$ value the re-counted power output of the GPG plant adds up to $W_{GPG-REC}$=13.4 MWe, providing the total plant efficiency at a level of 63.8%.

Figure 3:
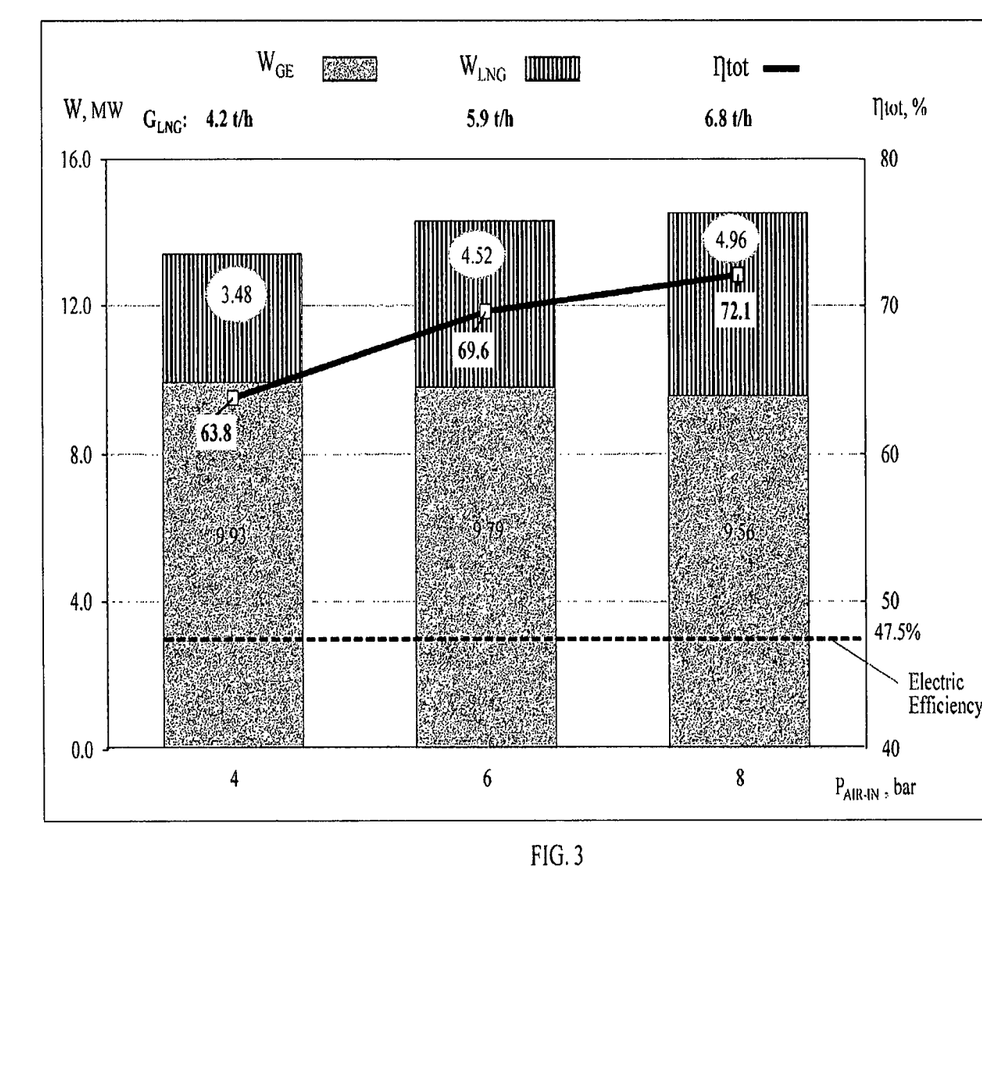
FIG. 3 is a diagram, showing an impact of charging air pressure on the LNG capacity and electric and re-counted outputs and efficiencies of GPG plant, according to the present invention.

At the described GPG plant, charging a modern large gas engine with the combustion air is performed at a pressure of $P_{AIR-IN}$=~4.0 barA. In so doing, specific LNG co-production without consumption any power or an additional fuel constitutes 0.43 ton/h per each MW of power generated by gas engine (GE). At the same time, the new gas engines with a much higher charging air pressure have been recently launched and are at the experimental stands of the OEM companies. With supposition of the $T_{EXH-OUT}$ data and fuel efficiency of the new engines, the conducted analysis has revealed a strong positive impact of an increase in the $P_{AIR-IN}$ value on improvement in the GPG plant performance as a whole and on an increase in total and specific LNG co-production values in particular. For example, an enhancement of the charging air pressure at the inlet of described 10 MW gas engine up to 6 and 8 barA leads to growing a specific LNG co-production at the GPG plant up to 0.61 and 0.7 ton/MWh simultaneously with an increase in their total (re-counted) efficiency up to 69.6 and 72.1% correspondingly. In addition, the enhancement in a share of NG being liquefied at the GPG plant up to 79% and 82% may be achieved. By this means a further advancement in the gas engines development opens up also the promising prospects for a significant improvement in the GPG technology performance as well. The results of comparative performance analysis of the GPG plants using a basic configuration with the gas engines having the different charging air pressures are presented in the Table 1 and FIG. 3.

TABLE 1

| Parameter | Unit | $P_{AIR-IN}$ = 4barA | $P_{AIR-IN}$ = 6barA | $P_{AIR-IN}$ = 8barA |
|---|---|---|---|---|
| Gas engine output, $W_{GE}$ | MWe | 9.73 | 9.73 | 9.73 |
| Hourly fuel consumption | t/h | 1.56 | 1.52 | 1.49 |
| Gas engine fuel efficiency | % | 46.3 | 47.3 | 48.3 |
| Exhaust gas temperature, $T_{EXH-OUT}$ | ° C. | 535 | 555 | 575 |
| Plant electric output, $W_{GPG}$ | MWe | 9.93 | 9.79 | 9.56 |
| Plant electric efficiency | % | 47.3 | 47.6 | 47.5 |
| Pressure of NG delivered | barA | 60 | 60 | 60 |
| High pressure of NG liquefied | barA | 80 | 80 | 80 |
| Low pressure of LNG co-product | barA | 5.1 | 5.1 | 5.1 |
| Hourly LNG co-production | t/h | 4.2 | 5.9 | 6.8 |
| A share of NG liquefied | % | 72.9 | 79.5 | 82.0 |
| Specific rate of LNG co-produced | t/MWh | 0.43 | 0.61 | 0.70 |
| Power equivalent of LNG co-product | MWe | 3.48 | 4.52 | 4.96 |
| Re-counted plant output, $W_{GPG-REC}$ | MWe | 13.41 | 14.31 | 14.52 |
| Total plant efficiency | % | 63.8 | 69.6 | 72.1 |

The possible end-users of the invented method are characterized by a wide diversity of an acceptable pressure of LNG co-product ($P_{LNG}$) and a required specific rate of LNG co-production. To meet the customer requirements, the basic design of the GPG plant shown in FIG. 1 may be supplemented by the exhaust gas compressor providing an increase in exhaust gas pressure $P_{GT-IN}$ at the gas turbine inlet and by the duct burner providing an increase in exhaust gas temperature $T_{WHRB-IN}$ at the waste heat recovery boiler inlet (see FIG. 2). Along with an optional possibility for increase in NG pressure $P_{HP-IN}$ at the gas liquefier inlet, all mentioned means make possible to customize the GPG plant configuration and provide the customer's demand for LNG co-product without reduction in electric output of the GPG plant. The parameters of the 10 MW GPG plant described above in the 6 plant optional configurations have been calculated for the different combinations of the mentioned NG and exhaust gases pressures and temperatures in the wide ranges of their possible values: $P_{LNG}$=1.05÷11 barA, $P_{GT-IN}$=3.5÷11.6 barA, $T_{WHRB-IN}$=535÷695° C. and $P_{HP-IN}$=60÷200 barA. The results of these calculations are presented below in the Table 2.

Figure 4:
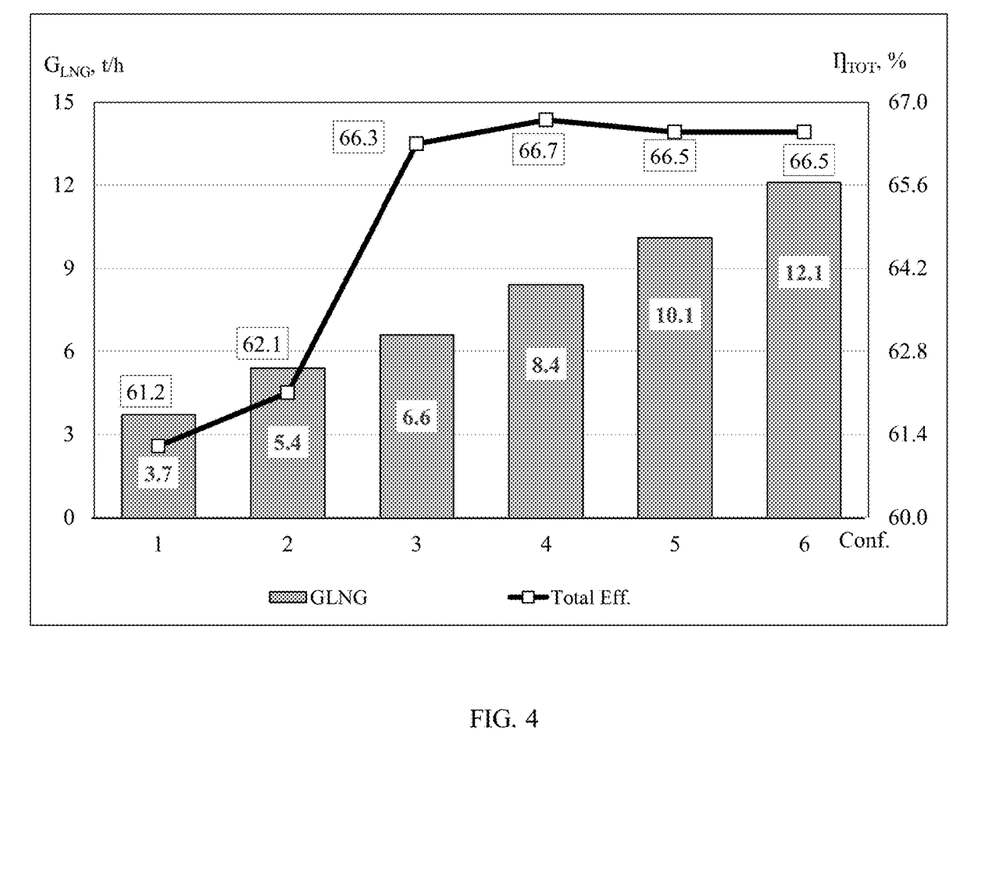
FIG. 4 is a diagram, showing an impact of the GPG plant configurations on amount of fuel self-consumed for LNG co-production, according to the present invention.
Figure 5:
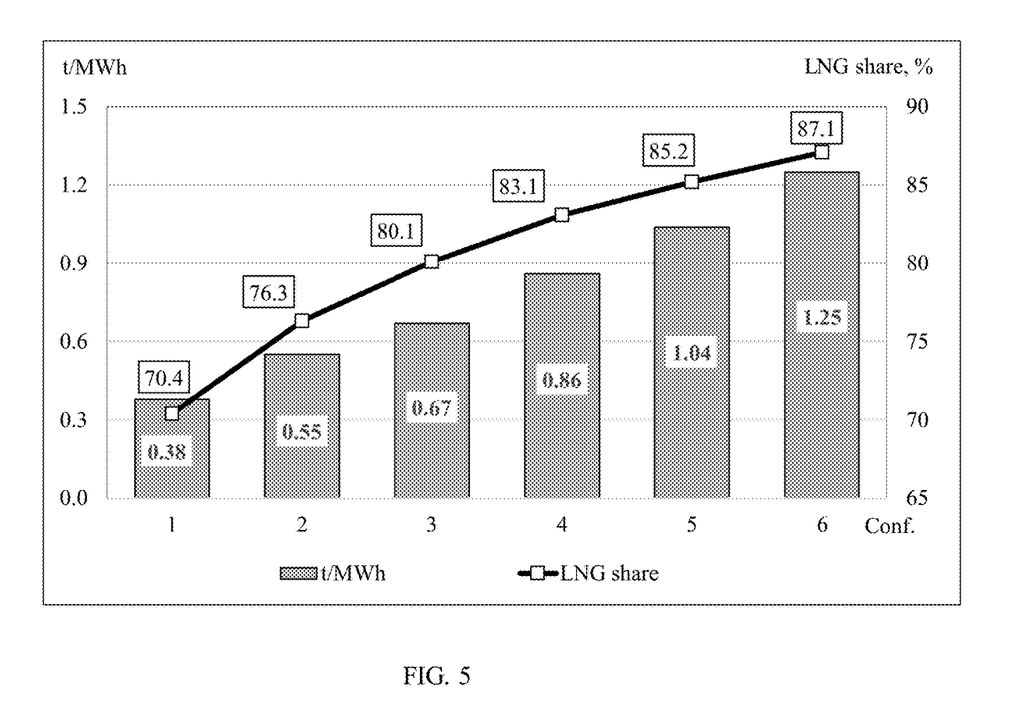
FIG. 5 is a diagram, showing an impact of the GPG plant configurations on specific LNG capacity and a share of NG liquefied, to the present invention.
Figure 6:
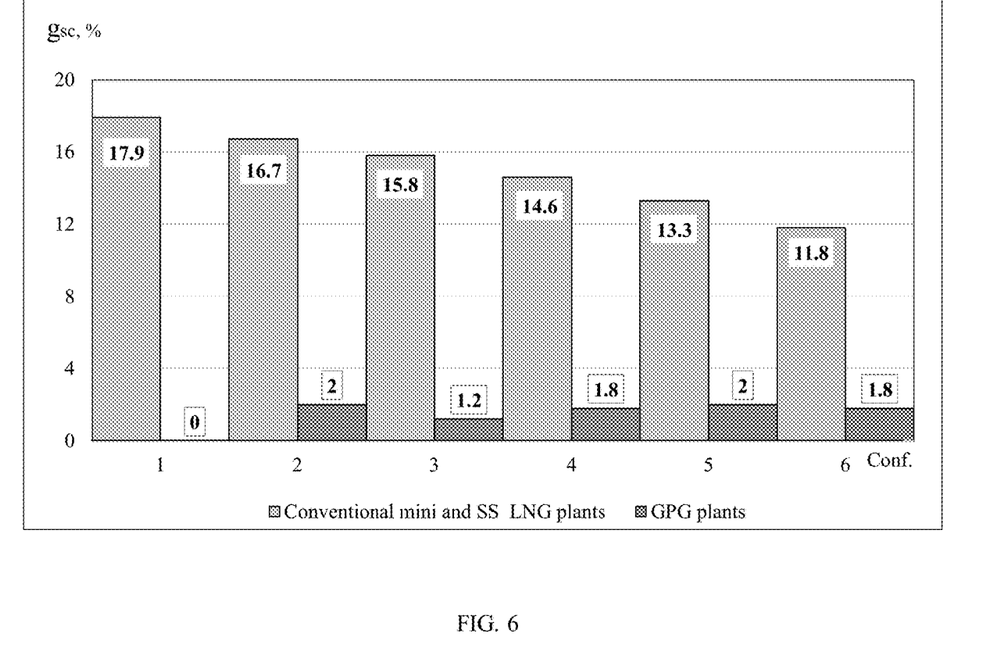
FIG. 6 is a diagram, showing an impact of the GPG plant configurations on LNG capacity and total plant efficiency, according to the present invention.

The graphical presentation of the calculation results is shown if the FIG. 4-6. As evident from the FIGS. 4 and 5, an increase in the exhaust gases pressure at the gas turbine inlet and the HP NG gas at the gas liquefier inlet together with an increase in pressure of the LNG co-product make possible to enhance an LNG co-production capacity in the plant configurations No. 5 and 6 up to $G_{LNG}$=10-12 t/h (that is by a factor of 2.7-3.3) simultaneously with an increase in the re-counted (total) GPG plant efficiency from $\eta_{REC}$=61.2% up to $\eta_{REC}$=66.5%. This is accompanied by a growing of a share of NG being liquefied at the GPG plant from 70.4% up to 85.2-87.1%. The mentioned results may be achieved without reduction in electric output of the GPG plant only through very efficient supplementary firing of a small amount of an additional fuel in the stream of hot exhaust gases escaped the gas engine. As evident from the FIG. 6, a self-consumption of fuel for LNG co-production at the GPG plant (if needed) does not exceed $g_{SC}$=1.2-2.0%, which is several times less than an amount of fuel self-consumed at the conventional mini and small-scale LNG plants comparable to the GPG plant in annual LNG capacity.

TABLE 2

| GPG plant configuration features | | Conf. | | | | | |
|---|---|---|---|---|---|---|---|
| | | 1 | 2 | 3 | 4 | 5 | 6 |
| Pressure of LNG co-product | barA | 1.05 | 1.05 | 5.1 | 11.0 | 11.0 | 11.0 |
| Exhaust pressure at GT inlet | barA | 3.5 | 6.9 | 6.9 | 9.9 | 11.6 | 11.6 |
| NG pressure at liquefier inlet | barA | 80 | 60 | 80 | 100 | 120 | 200 |
| Exhaust temperature at WHRB inlet | ° C. | 535 | 615 | 595 | 645 | 680 | 695 |
| GPG plant parameter | Unit | | | | | | |
| GPG plant power output | MWe | 9.72 | 9.77 | 9.81 | 9.78 | 9.74 | 9.68 |
| Hourly fuel consumption by DB | t/h | 0 | 0.11 | 0.08 | 0.15 | 0.20 | 0.22 |
| Hourly feel consumption by GPG plant | t/h | 1.56 | 1.67 | 1.64 | 1.71 | 1.76 | 1.78 |
| Total heat input with NG fuel | MWth | 21.01 | 22.52 | 22.13 | 23.06 | 23.74 | 24.03 |
| Hourly LNG co-production at GPG plant | t/h | 3.70 | 5.36 | 6.60 | 8.40 | 10.08 | 12.06 |
| A share of NG liquefied at GPG plant | % | 70.4 | 76.3 | 80.1 | 83.1 | 85.2 | 87.1 |
| Specific rate of LNG co-produced | t/MWh | 0.38 | 0.55 | 0.67 | 0.86 | 1.04 | 1.25 |
| Annual LNG co-production at GPG plant | kton/y | 30.8 | 44.6 | 54.9 | 69.9 | 83.9 | 100.4 |
| Specific power consumed at SS LNG plants | kWh/t | 852 | 787 | 738 | 667 | 600 | 522 |
| Fuel self-consumed in LNG production: | | | | | | | |
| at SS LNG plant | % | 17.9 | 16.7 | 15.8 | 14.5 | 13.3 | 11.8 |
| at GPG plant | % | 0 | 2 | 1.2 | 1.8 | 2.0 | 1.8 |
| Power equivalent of LNG co-product | MWe | 3.15 | 4.22 | 4.87 | 5.60 | 6.05 | 6.30 |
| Re-counted GPG plant output, $W_{GPG-REC}$ | MWe | 12.87 | 13.99 | 14.68 | 15.38 | 15.79 | 15.98 |
| Total GPG plant efficiency | % | 61.2 | 62.1 | 66.3 | 66.7 | 66.5 | 66.5 |

Figure 7:
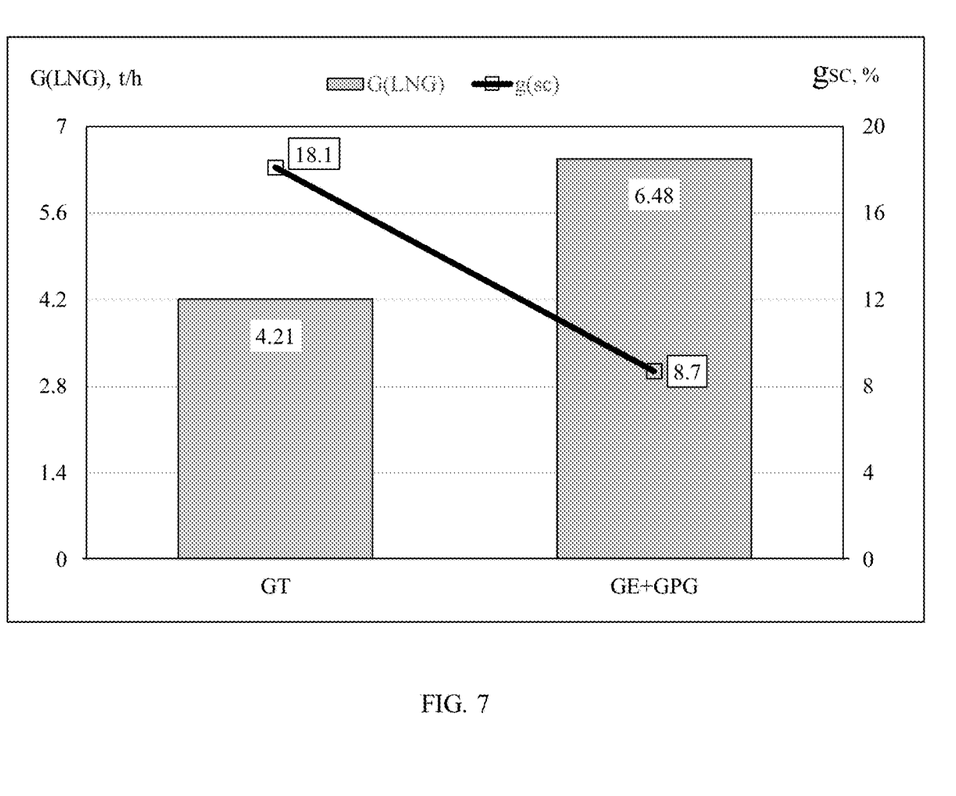
FIG. 7 is a diagram, showing an impact of the proposed method on an extra LNG production at the small-scale LNG plants, according to the present invention.

Application of the GPG technology for driving the refrigeration compressors and producing an extra LNG at the LNG plant may also be very promising, especially at the micro and mini-scale LNG facilities. The N2 expander technology is usually used at these plants for the LNG production, resulting in simplification of their design but significantly increasing an energy intensity of the liquefaction process. The results of comparative analysis of two approaches to energy supply of the mini-scale LNG plant are presented in the Table 3 and FIG. 7.

TABLE 3

| LNG plant features and parameters | Unit | Prime mover at the LNG plant | |
|---|---|---|---|
| | | SC gas turbine | Gas engine + GPG |
| Electric power of prime mover | kW | 3,515 | 3,706 |
| Electric efficiency of prime mover | % | 27.9 | 47.5 |
| Fuel consumed by prime mover | t/h | 0.93 | 0.58 |
| Main NG lquefaction technology | | $N_2$ expander cycle at $P_{LNG} = 1.05 barA$ | |
| Specific power consumed by expander cycle | kWh/t | 835 | 835 |
| LNG produced with use of expander cycle | t/h | 4.21 | 4.44 |
| Fuel self-consumed in expander cycle | % | 18.1 | 11.5 |
| Use of GPG technology | | no | yes |
| Specific extra LNG co-production rate | kg/kWh | n/a | 0.55 |
| Extra LNG co-production | t/h | n/a | 2.04 |
| Increase in LNG co-production | % | n/a | 48.4 |
| Total hourly LNG production | t/h | 4.21 | 6.48 |
| Annual LNG production at 8322 h/y | MTPA | 0.035 | 0.054 |
| Extra feel consumed by GPG | t/h | n/a | 0.042 |
| Fuel self-consumed in extra LNG production | % | n/a | 2.0 |
| Re-counted fuel self-consumed at LNG plant | % | n/a | 8.7 |
| Re-counted specific power consumed | kWh/t | n/a | 572 |

Here the mini-scale LNG plant is exemplified by a facility producing 4.2 ton/h of LNG (~35 kton/y) at a pressure of 1.05 barA and consuming ~3.5 MW of power from its own prime mover. A small gas turbine has been selected as such mover for the first variant of the LNG plant power supply. A high specific power consumed in the small-scale $N_2$ expander cycle (835 kWh/ton) and a low fuel-to-power conversion efficiency (27.9%) of the GT lead to a high amount of fuel self-consumed (18.1%) at the plant. This first power supply variant is compared with the application of gas engine (GE)-based GPG technology, wherein 3.7 MW gas engine is used as a prime mover at the LNG plant. The LNG co-production in this technology is moderately enhanced up to 0.55 t/MWh using the measures described previously for the configuration No. 2 of the GPG plant in the Table 2. The second variant of power supply makes possible to reduce a fuel self-consumption in generating a power required for the N2 expander cycle down to 11.5%, resulting from a much higher fuel-to-power conversion efficiency (47.5%) of the GE only. In addition, this variant provides generation of an extra LNG product at a rate of ~2 ton/h, resulting in augmentation of plant LNG capacity by 48.4%. Since a fuel self-consumption in production of the extra LNG does not exceed 2%, total fuel self-consumption at the LNG plant using GPG technology may be reduced down to 8.7%. Finally, the mentioned increase of LNG capacity by almost 50% is achieved without installation of an additional specialized refrigeration equipment and calls only for increasing a capacity of the NG pre-treatment unit and harnessing the gas liquefier in its simplified design.

It should be noted that the term "comprising" does not exclude other elements or steps and "a" or "an" do not exclude a plurality. It should also be noted that reference signs in the claims should not apparent to one of skill in the art that many changes and modifications can be effected to the above embodiments while remaining within the spirit and scope of the present invention.

What is claimed as new is:

1. A method for an exhaust waste energy recovery at a reciprocating gas engine-based polygeneration plant, comprising in combination:
   supplying said polygeneration plant with a methaneous gas selected from a group consisting of pipeline natural gas, biogas, landfill gas, coal-bed methane and renewable methane and used as a fuel in said gas engine;
   supplying the gas engine with a charging air pressurized by an air compressor and cooled upstream of the gas engine;
   burning a mixture of the fuel and the charging air in the gas engine producing a gas engine power output, as a main product of the polygeneration plant, and releasing a pressurized exhaust gas stream comprising a mixture of nitrogen, oxygen, carbon dioxide and water vapor at a high temperature;
   harnessing most of a hot thermal energy of the pressurized exhaust gas for production of a process steam in a waste heat recovery boiler installed at an outlet of the gas engine;
   using the process steam for production of a power output of a steam bottoming cycle;
   expanding the pressurized exhaust gas in a gas turbine installed downstream of said waste heat recovery boiler, resulting in recovering a kinetic energy and a remainder of a thermal energy of the pressurized exhaust gas for production of a power output of said gas turbine;
   using at least a part of the power outputs of said gas turbine and said steam bottoming cycle for driving said air compressor; and
   additionally comprising:
   supplying the polygeneration plant with said methaneous gas at a rate exceeding an amount of said fuel used by the gas engine;
   forming a pre-treated methaneous gas stream through drying and purifying a supplied methaneous gas as needed to meet a pre-treatment quality standard set up for the methaneous gas being liquefied;

compressing the pre-treated methaneous gas up to a high pressure of at least 60barA by a methaneous gas compressor if necessary, resulting in forming a high-pressure methaneous gas stream;

pre-cooling said high-pressure methaneous gas, thereby forming a pre-cooled high-pressure methaneous gas stream;

reducing in temperature the pressurized exhaust gas that, escaped the waste heat recovery boiler, to a near ambient value with accompanied drainage of a formed condensate;

drying the pressurized exhaust gas and following pre-cooling a dried pressurized exhaust gas to a temperature below 0° C. in a cold regenerator, forming a dried and pre-cooled pressurized exhaust gas stream upstream of said gas turbine;

said expanding of the dried and pre-cooled pressurized exhaust gas in the gas turbine, resulting in producing the power output by said gas turbine and forming a deeply cooled non-pressurized exhaust gas stream discharged from the gas turbine;

recovering a cold thermal energy of said deeply cooled non-pressurized exhaust gas first for a liquefying of the whole of said pre-cooled high-pressure methaneous gas in a gas liquefier and then for said pre-cooling of the dried pressurized exhaust gas in said cold regenerator;

using a non-pressurized exhaust gas removed from the cold regenerator to an atmosphere for removing a water vapor captured during said drying of the pressurized exhaust gas;

depressurizing a high-pressure liquefied methaneous gas escaped the said gas liquefier down to a selected low pressure, resulting in forming a low-pressure two-phase liquefied methaneous gas stream;

separating said low-pressure two-phase liquefied methaneous gas stream, resulting in forming a low-pressure methaneous vapor stream and a low-pressure liquefied methaneous gas stream;

using said low-pressure methaneous vapor as the fuel for the gas engine;

using said low-pressure liquefied methaneous gas as a co-product of the polygeneration plant; and using a part of the power outputs of the gas turbine and the steam bottoming cycle for driving said methaneous gas compressor.

2. A method as in claim 1, wherein depressurizing the high-pressure liquefied methaneous gas is performed sequentially first in a work-performing liquefied methaneous gas expander so that a medium-pressure liquefied methaneous gas is formed and then in a Joule-Thompson valve.

3. A method as in claim 2, wherein a cold thermal energy of the low-pressure methaneous vapor is recovered first for subcooling said medium-pressure liquefied methaneous gas upstream of the Joule-Thompson valve, and then for said pre-cooling of the high-pressure methaneous gas upstream of said gas liquefier.

4. A method as in claim 1, wherein a pressure of the low-pressure methaneous vapor upstream of the gas engine is provided at a level exceeding a pressure of the charging air through said selecting of the low pressure of said two-phase liquefied methaneous gas stream or/and compressing the low-pressure methaneous vapor if necessary.

5. A method as in claim 1, wherein said drying of the pressurized exhaust gas is performed by a pressure swing adsorber, wherein said non-pressurized exhaust gas outgoing from the cold regenerator is used for purging a regenerated bed of said pressure swing adsorber.

6. A method as in claim 5, wherein removing the non-pressurized exhaust gas from the pressure swing adsorber to the atmosphere is performed by an exhaust fan consuming a part of the power outputs of the gas turbine and the steam bottoming cycle.

7. A method as in claim 1, wherein an enhanced yield of the polygeneration plant co-product is achieved through an increase in a pressure of the high-pressure methaneous gas at an outlet of the methaneous gas compressor up to a value exceeding 60barA.

8. A method as in claim 1, wherein an enhanced yield of the polygeneration plant co-product at a given pressure of the charging air is achieved through an increase in a pressure of the dried and pre-cooled pressurized exhaust gas at an inlet of the gas turbine, resulting in producing an extra power output by said gas turbine and in additional reducing a temperature of the deeply cooled non-pressurized exhaust gas stream escaped the gas turbine.

9. A method as in claim 8, wherein said increase in the pressure of the dried and pre-cooled pressurized exhaust gas is performed with use of an exhaust gas compressor installed upstream of the pressure swing adsorber and equipped with an aftercooler.

10. A method as in any one of claims 7 to 9, wherein an extra power output of the steam bottoming cycle is provided through supplementary firing an additional fuel in the stream of the pressurized exhaust gas ahead of the waste heat recovery boiler.

11. A method as in any one of claims 7 to 10, wherein said extra power outputs of the steam bottoming cycle and the gas turbine are consumed for driving said exhaust gas compressor and for serving the needs of the methaneous gas compressor for a higher power input.

* * * * *